(12) United States Patent
Prisco et al.

(10) Patent No.: US 11,347,193 B2
(45) Date of Patent: May 31, 2022

(54) AUTOMATING REACTIVE IMPEDANCE MEASUREMENTS

(71) Applicant: International Business Machines Corporation, Armonk, NY (US)

(72) Inventors: Joseph Prisco, Rochester, MN (US); Michael Paul Petrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 16/792,198

(22) Filed: Feb. 15, 2020

(65) Prior Publication Data
US 2021/0255594 A1    Aug. 19, 2021

(51) Int. Cl.
G05B 19/042    (2006.01)

(52) U.S. Cl.
CPC .... *G05B 19/042* (2013.01); *G05B 2219/2639* (2013.01)

(58) Field of Classification Search
CPC ............... G05B 19/042; G05B 2219/2639
See application file for complete search history.

(56) References Cited

U.S. PATENT DOCUMENTS

| | | | |
|---|---|---|---|
| 5,340,964 A * | 8/1994 | Galloway | H02H 3/042 219/486 |
| 6,559,654 B2 | 5/2003 | Ho | |
| 7,531,253 B2 | 5/2009 | Ramschak | |
| 8,069,000 B2 | 11/2011 | Kim | |
| 8,405,339 B2 | 3/2013 | Zhang | |
| 9,964,583 B2 | 5/2018 | Hirsh | |
| 2002/0180458 A1 * | 12/2002 | Ho | G01R 27/2611 324/623 |
| 2009/0307515 A1 | 12/2009 | Bandholz | |
| 2020/0099176 A1 * | 3/2020 | Mourrier | H02J 7/00306 |
| 2020/0117249 A1 * | 4/2020 | Ferguson | H04B 3/542 |
| 2020/0195008 A1 * | 6/2020 | Cheng | H02J 3/14 |

FOREIGN PATENT DOCUMENTS

| | | |
|---|---|---|
| CA | 2708067 A1 | 6/2009 |
| CN | 108414838 A | 8/2018 |
| EP | 1795907 A1 | 6/2007 |

* cited by examiner

*Primary Examiner* — Thomas C Lee
*Assistant Examiner* — Ameir Myers
(74) *Attorney, Agent, or Firm* — Jared L. Montanaro

(57) ABSTRACT

A system and a method for automatically determining and analyzing electrical responses related to a group of elements. In an embodiment, the method includes one or more computer processors determining a group of elements electrically connected to a power distribution unit that supplies AC power to an AC load of the group of elements. The method further includes determining a resistance corresponding to the group of elements utilizing a solid-state relay. The method further includes dictating a phase angle trigger value to activate a solid-state current-flow control device. The method further includes determining a set of inductive impedance values corresponding to the group of elements utilizing the solid-state current-flow control device to control AC current flow to the group of elements based on the dictated phase angle trigger value. The method further includes generating an analysis of the determined set of inductive impedance values corresponding to the group of elements.

20 Claims, 6 Drawing Sheets

AUTOMATING REACTIVE IMPEDANCE MEASUREMENTS

BACKGROUND OF THE INVENTION

The present invention relates generally to the field of electrical measurements, and more particularly to automating reactive impedance measurements associated with electronic devices powered by alternating current.

Power distribution systems for delivering alternating current (AC) electrical power to a plurality of AC powered devices and equipment (e.g., AC loads) within an area can range from a simple AC power strip supporting a handful of AC load to complex, integrated power distribution systems that can monitor and control various aspects of the AC loads connected to the integrated power distribution system.

Some features common to AC power distribution systems and associated AC loads are the electrical connections and corresponding power cables associated with transferring the AC power from the power distribution system to each of the AC load. Electrical power connections can include plugs and sockets, lugs, terminals, spade connectors, etc., connected to the AC power distribution system, an AC power cable, and/or an AC load. Each of the AC power connections between an AC power distribution system, a power cable and, an AC load includes pairs of conductive surfaces that mechanically interface to transfer the AC power to an AC load. The resistance to AC current flow through the AC power connections, power cables, and a corresponding AC load can be measured as an impedance value. Since the AC power connections and corresponding power cables are subject mechanical and environments factors, over time maintenance of these components may be necessary. A change in impedance is one factor that can indicate that maintenance is required.

SUMMARY

According to an aspect of the present invention, there is a method, system, and computer program product, for automatically determining and analyzing electrical responses related to a group of elements. The method includes at least one computer processor determining a group of elements electrically connected to a power distribution unit (PDU), wherein the PDU supplies AC power to an AC load of the group of elements. The method further includes at least one computer processor determining a resistance corresponding to the group of elements utilizing a solid-state relay. The method further includes dictating a phase angle trigger value to activate a solid-state current-flow control device. The method further includes at least one computer processor determining a set of inductive impedance values corresponding to the group of elements utilizing the solid-state current-flow control device to control the AC current flow to the group of elements based on the dictated phase angle trigger value. The method further includes at least one computer processor generating an analysis of the determined set of inductive impedance values corresponding to the group of elements.

DETAILED DESCRIPTION

Figure 1:
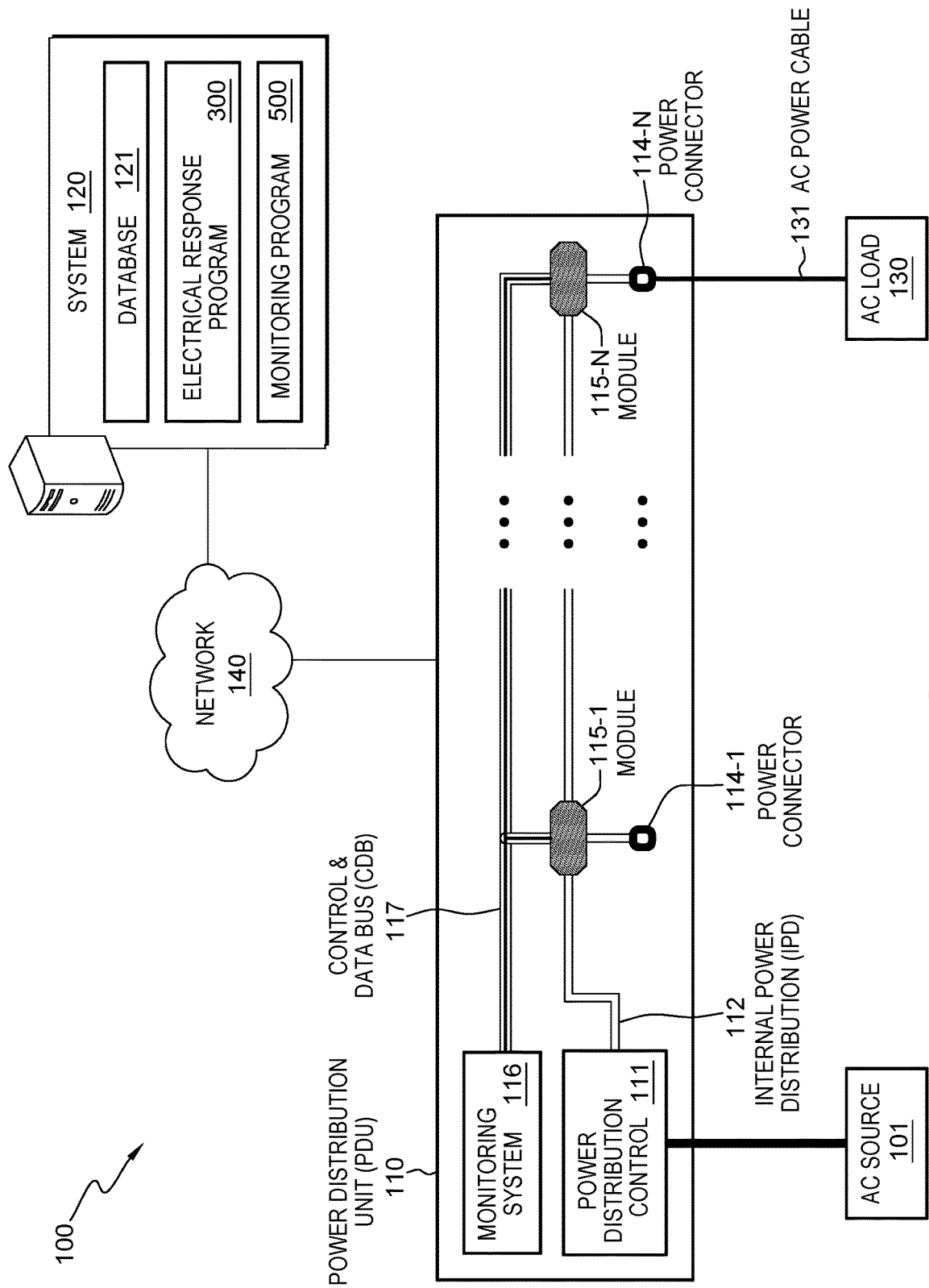
FIG. 1 illustrates a computing device environment, in accordance with an embodiment of the present disclosure.

Embodiments of the present disclosure recognize that electrical connections between alternating current (AC) power distribution systems, associated AC power cables, and electrical power connections to AC loads (e.g., AC powered electrical devices) can loosen; become contaminated with dust, dirt, and debris; and/or corrode over time due to expansion and contraction, vibrations, mechanical strains, and/or environmental factors (e.g., temperature, humidity, chemical or material contamination, etc.). Loose, contaminated, and/or corroded electrical connections increase the impedance between conductive surfaces associated with electrical connections, which can lead to heating or arcing at the affected conductive surfaces. Affected electrical connections can adversely impact electrical and electronic equipment connected to an AC power distribution system; or worse, pose a potential fire hazard. Embodiments of the present disclosure also recognize that AC power cables can become damaged.

Embodiments of the present disclosure recognize that various preventative maintenance activities that can identify affected electrical connections are manual and are labor intensive. For example, disconnecting power cables and visually inspecting conductive surfaces, utilizing infrared scans to identify "hot" spots associated with localized heating or arcing, or employing voltage and current measuring devices. Various preventative maintenance activities are done by a person in compliance with all local electrical codes, which can include wearing personal protective equipment (PPE), such as insulating gloves, insulating clothing, a helmet, and goggles to protect from shock and/or arc flash hazards.

Embodiments of the present disclosure also recognize that preventative maintenance must be performed at periodic intervals and may dictate that the electrical equipment is taken off-line during the maintenance activities. In particular, embodiments of the present disclosure further recognize that within the information technology (IT) arena, such preventative maintenance measures are very disruptive to aspects of a data center. Various computing systems, storage systems, communication systems (e.g., networks), and other IT equipment are not monolithic entities; but instead are enclosure or rack-based systems and include a plurality of individual electronic devices and components connected to an "intelligent" power distribution system that can control and monitor various aspects of the enclosure, such as temperature, air-flow, power consumption, dynamic control of some components for saving energy, etc.

Embodiments of the present disclosure provide a solution to some manual preventative maintenance activities. Embodiments of the present disclosure augment components already included within a power distribution unit (PDU) of a system enclosure or rack of an IT system with solid-state relays and solid-state current-flow control devices (SSCFCDs), such as triodes for alternating current (TRIACs), silicon-control rectifies (SCRs), gate turn-off thyristors, etc., to determine resistance and inductive impedance for AC loads downstream of the control and monitoring hardware within the PDU. Embodiments of the present disclosure also utilize the solid-state relays in conjunction with a solid-state current-flow control device to generate harmonic voltage and harmonic current distortions utilized to calculate inductive impedance values, improve response-times, and avoiding effects associated with mechanical relays, such voltage transients and contact arcing.

Embodiments of the present disclosure measure voltage and current across a spectrum of frequency harmonics to minimize the effects of resonance points and parasitic capacitance on various analyses related to various elements of an IT system. As used herein, an element to analyze includes but is not limited to an electrical connection, such as a socket within the PDU, an AC power connection (e.g., power connector) at the AC load, and the electrical connection of an AC power cable; the AC power cable; a corresponding AC load (e.g., component, subsystem, etc.) associated with an IT system, or a combination thereof. In addition, embodiments of the present disclosure can generate differing inductive reactance analyses by controlling the phase angle trigger value applied to an SSCFCD.

Various embodiments of the present disclosure automatically analyze new equipment and/or installations associated with a PDU prior to an enclosure or one or more AC loads (e.g., components) within the enclosure being brought on-line. As such, embodiments of the disclosure generate a baseline set of resistance and inductive impedance measurements related to various elements associated with the enclosure. Another embodiment of the present disclosure can automatically re-analyze one or more AC loads and associated elements on a periodic basis to perform in-situ tests to determine whether one or more elements associated with the IT system requires maintenance activity, such as retightening, cleaning, replacement, etc.

Some embodiments of the present disclosure can be included in a mobile PDU and utilize known-good parts and/or reference (e.g., calibrated) AC loads, which are utilized to isolate and analyze one element from among a string of elements. Other embodiments of the present disclosure can be utilized to test and analyze electrical connections and AC loads different from AC powered IT devices and equipment, such as radio equipment, television equipment, machinery, power tools, etc.

One skilled in the art would recognize that by automating the in-situ measurement of impedance for elements of an IT system the reliability associated with the IT system is improved. Further, unnecessary manual preventative maintenance inspections can be reduced, decreasing costs and limiting exposure of personnel to electrical hazards. By generating, compiling, and analyzing baseline impedance results with respect to periodic automated in-situ tests, and reports from real-world maintenance activities correlations between impedance analyses and actual maintenance issues the present disclosure is integrated within a practical application.

The descriptions of the various scenarios, instances, and examples related to the present disclosure have been presented for purposes of illustration but are not intended to be exhaustive or limited to the embodiments disclosed.

The present disclosure will now be described in detail with reference to the Figures. FIG. 1 is a functional block diagram illustrating environment 100, in accordance with embodiments of the present disclosure. In an embodiment, environment 100 includes: AC source 101, power distribution unit (PDU) 110, system 120, AC load 130, and network 140. In an embodiment, PDU 110 and system 120 are interconnected via network 140. In some embodiments, environment 100 includes a plurality of instances of AC load 130, connected to an instance of PDU 110. As used herein, "connected to PDU 110" refers to at least an AC power cable and may include electrical connections at one or both ends of the AC power cable. In an example, an instance of AC load 130 is electrically connected to PDU 110 via an instance of AC power cable 131. In various embodiments, environment 100 includes other instances of AC source 101 (not shown) that supply AC electrical power to other portions of environment 100, such as system 120; components of network 140, such as routers and switches (not shown); and/or a portable version of PDU 110 (not shown).

AC source 101 is representative of a source of alternating current electricity for powering various aspects of environment 100. In the illustrative embodiment, AC source 101 supplies AC power to PDU 110 for utilization by one or more instances of AC load 130. AC source 101 may be single phase AC power, 3-phase AC power, or another applicable AC power source. AC source 101 is of a voltage compatible with PDU 110 and can be of a standardized AC frequency, such as 50 Hz or 60 Hz for a sinusoidal voltage waveform.

In an embodiment, PDU 110 is an intelligent power distribution unit within an IT enclosure (not shown). PDU 110 includes power distribution control 111; internal power distribution (IPD) 112; a plurality of power connectors, such as power connectors 114-1 through 114-N (collectively power connectors 114); modules 115-1 through module 115-N electrically connected to respective power connectors of power connectors 114; monitoring system 116; control & data bus (CDB) 117; and a plurality of other components, such as fans, indicator lights, network connections, etc. In various embodiments, PDU 110 includes additional components described in further detail with respect to FIG. 2, such as an internal communication network. PDU 110 may also include a control panel (e.g., console) or other interface device, which can include a micro-controller, system-on-a-chip, or other computer hardware for internally controlling aspects of PDU 110. Software and data utilized to operate PDU 110 may be included in firmware (not shown) or download from another source, such as system 120.

In an embodiment, power distribution control 111 includes power buses, circuit breakers, control relays, a network interface, etc., (not shown) that controls the distribution of AC power from AC source 101 among the power connectors of power connectors 114 utilizing internal power distribution (IPD) 112. Power distribution control 111 may respond to commands issued by system 120. In some embodiments, power distribution control 111 can selectively activate and deactivate AC power to one or more of power connectors of power connectors 114 and one or more respective modules 115 by controlling portions of IPD 112. In other embodiments, power distribution control 111 can selectively activate and deactivate AC power to one or more of power connectors 114 by controlling an aspect of respective module 115-1 through 115-N utilizing CDB 117 or a communication network internal to PDU 110. In various embodiments, power distribution control 111 interfaces with monitoring system 116 to monitor aspects of PDU 110, such as power usage within and among features and other installed IT components or sub-systems.

IPD 112 is representative of a plurality of buses and/or cables that distributes AC power to modules 115 and corresponding power connectors 114; and other components of PDU 110 that utilize AC power, such as monitoring system 116.

Power connectors 114 are representative of a plurality of AC power connectors included within PDU 110 that provide conductive interfaces that electrically connect to instances of AC power cable 131 and transport AC power to respective instances of AC load 130. In an example, a power connector of power connectors 114 may represent a socket connector, a set of spade connectors, a set of screw terminals, or other applicable electrical connect type utilized within an IT system enclosure. In various embodiments, power connectors 114 are representative AC power connections or power connectors that include two conductive interfaces; a "hot" or AC current supply connection, and a neutral or AC current return connection.

Figure 2:
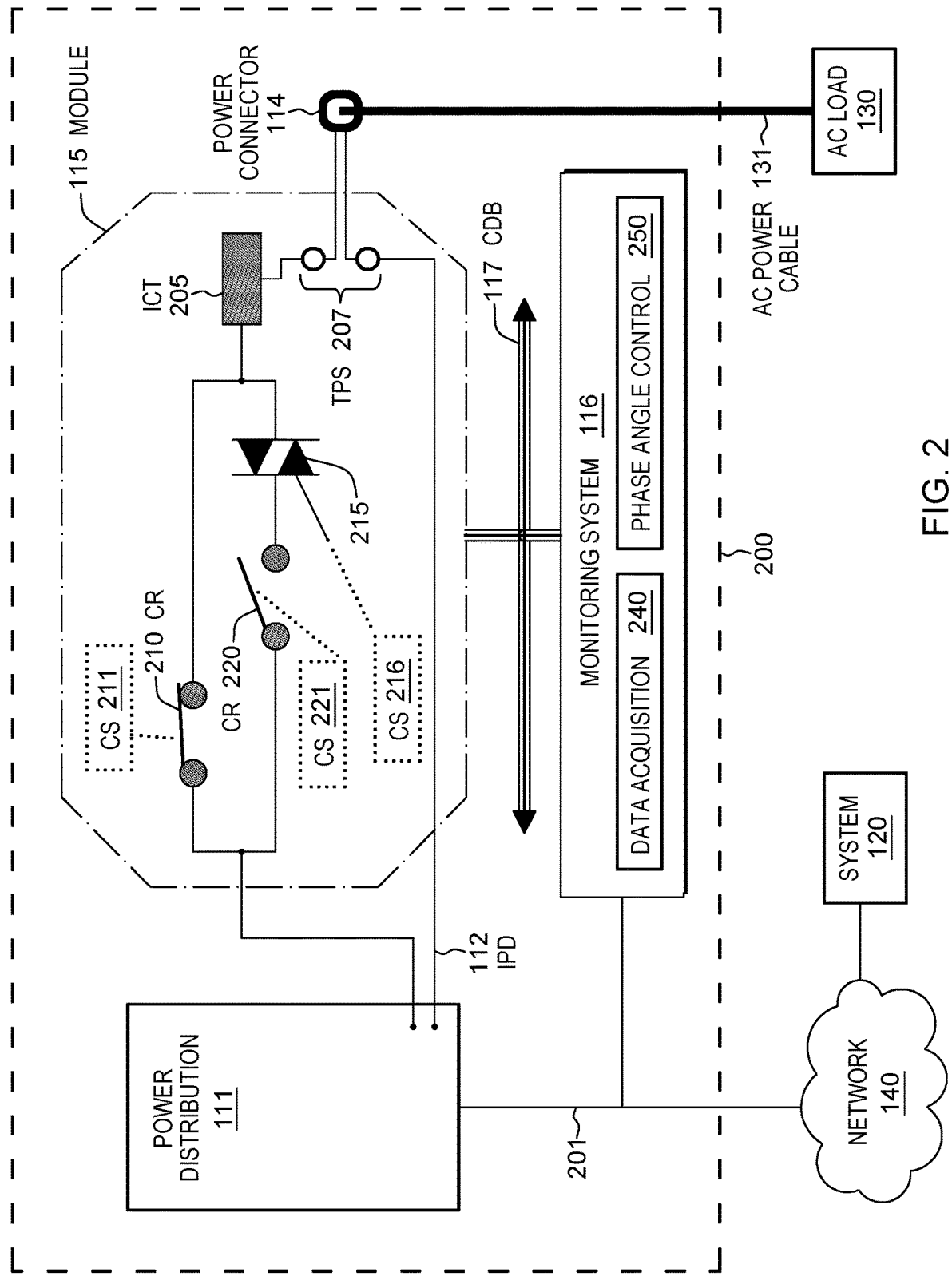
FIG. 2 illustrates aspects of a power distribution unit and a circuit diagram of a module within the power distribution utilized to automate the measurement reactive impedance of an AC load electrically connected to the power distribution unit, in accordance with an embodiment of the present disclosure.

In an embodiment, module 115-1 through module 115-N (herein collectively referred to as modules 115) includes additional components and features described in further detail with respect to FIG. 2. In various embodiments, modules 115 represent control models that are utilized to generate controlled interruptions of AC power to an AC load. In response to a module, such as module 115-N generating an interruption of AC power to AC load 130, monitoring system 116 determines AC voltage and current values at various harmonics for predetermined phase angle trigger value. In some embodiments, modules 115 constrain the interruption of AC power to a single AC signal cycle items of IT equipment, such as one 0 to 360 degrees+/−1 degree of sinusoidal AC voltage cycle, a duration of 20 milliseconds+/−0.01 milliseconds at 50 HZ AC beginning at zero VAC+/−0.25 VAC, or a duration of 16.67 milliseconds+/−0.01 milliseconds at 60 HZ AC beginning at zero VAC+/−0.3 VAC. The duration of the AC power interruption is constrained to avoid creating instabilities and/or power supply cut-out associated with an item of IT equipment.

Monitoring system 116 is a system that controls and monitors various aspects of PDU 110 and includes input/output (I/O) capabilities associated with CDB 117, internal and external communication capabilities, control and measurements circuitry associated with modules 115, etc. In some embodiments, monitoring system 116 also includes a plurality of electronic devices and sensors discussed in further detail with respect to FIG. 2. For example, monitoring system 116 also includes the capabilities to convert monitoring data, such as electrical signals, AC waveforms, environmental data, etc., into digital information and values for processing by various aspect of system 120. Similarly, monitoring system 116 can convert digital information received to PDU 110 into commands, control signals, electrical signals, etc., utilized within PDU 110. In various embodiments, monitoring system 116 interfaces with system 120 and one or more executing programs therein, such as electrical response program 300 or a system management facility (not shown).

In an embodiment, CDB 117 represents an I/O communication bus utilized to transmit control signals and commands to various aspects of PDU 110, such as one or more modules 115, and receive signals and information back from components of the respective one or more modules 115 for analysis by monitoring system 116. CDB 117 may be part of a communication backbone within PDU 110 that enables communication among power distribution control 111, a control panel, and/or other computing hardware (not shown) that internally controls aspects of PDU 110. In various embodiments, CDB 117 also includes channels for communicating analog information, such as voltages, waveforms, AC signals, etc., among components of PDU 110. In some embodiments, CDB 117 is a separate communication bus from internal network 201 (described in further detail with respect to FIG. 2).

In an embodiment, system 120 is representative of an administrative system utilized to monitor and control various aspects of environment 100, such as activities of IT systems and/or nodes (e.g., compute, storage, network, etc.) that include instances of PDU 110; distribute workloads; determine a status associated with various items and components of environment 100; etc. In one embodiment, system 120 includes database 121, electrical response program 300, monitoring program 500, and a plurality of other programs and data (not shown). Examples of other programs and data include, a system management facility (SMF), a database program, visualization software, a statistical analysis suite, an electrical analysis program, a spreadsheet program, communications programs, maintenance scheduling software, a load balancer, etc.

In another embodiment, system 120 is representative of an embedded micro-controller, a PC, etc., within each instance of PDU 110. In various embodiments, system 120 can interface and exchange information with other computing systems external to environment 100 (not shown), such as other instance of system 120 environment 100 and/or within different environment 100's, a computer of a service organization, an enterprise-version of database 121, a system that performs machine learning to generate and update models (e.g., monitoring schedules, reaction thresholds, etc.) related to AC power connectors/connections associated with PDU and associated AC loads.

Database 121 is associated with information and data related to various IT systems (not shown) of environment 100 that include an instance of PDU 110. Database 121 also includes a plurality of settings, criteria, thresholds, formulas, etc., utilized by various programs and analyses. In one example, database 121 includes statistical control limits and criteria to determine whether electrical results indicated resonance instabilities (e.g., exceeds a threshold or tolerance), which triggers a different phase angle trigger value for an analyses; or whether the electrical results indicate an issue with a selected element. In another example, database 121 also includes groups of phase angle trigger values, a phase angle increment value, a range of harmonic numbers to analyze, a groups of harmonic numbers associated with a particular analysis, a number of retests of a phase angle trigger value to obtain statistically significant results and eliminate outliers, a delay between retests, number of values associated with a running standard deviation of inductance values corresponding to harmonic numbers, etc.

In an embodiment, database 121 also includes historic data (e.g., baseline data and analyses, one or more subsequent tests, etc.) obtained prior to an instance of electrical response program 300 and/or an instance of monitoring program 500 determining electrical response data and generating analyses for one or more set of elements identified for analysis (e.g., testing) within environment 100. In one embodiment, a portion of historical data within database 121 corresponds to a set of baseline data and analyses for a plurality of elements connected to PDU 110. Historic data includes, but is not limited to, voltage and current measurements, waveforms captured by a digital oscilloscope (not shown), calculations of resistance and inductance, plots of inducive impedance (depicted in further detail with respect to FIG. 4), root-cause analyses related to maintenance activity, inspection results, repair durations, etc.

In various embodiments, database 121 further includes a plurality of thresholds, actions, responses, decision trees, etc., related to issues troubleshooting and/or correcting an indicated issue, such as initiating a visual inspection of an AC power connection or replacing an AC power cable. Thresholds, actions, responses, etc., within database 121 may be determined and/or updated via machine learning or by personnel associated with environment 100. In some embodiments, database 121 also includes the electrical response information and analyses determined by electrical response program 300 in response to monitoring program 500 initiating periodic automated impedance measurements associated with preventative maintenance. Database 121 also includes models for generating the schedules related to performing the automated impedance measurements corresponding to the elements connected to an instance of PDU 110, reaction thresholds for initiating maintenance activities, etc. In other embodiments, database 121 also includes data and analyses from other instances of environment 100. In a further embodiment, an enterprise instance of database 121 (not shown) aggregated the data, information, and analyses from each instance of database 121.

Electrical response program 300 is a program for determining a set of electrical responses (e.g., resistance, reactive inductance, etc.) for various electrical components and subsystems; and corresponding electrical connectors/connections and AC power cables connected to an AC PDU. In an embodiment, electrical response program 300 interfaces with an PDU 110 to initiate various in-situ actions and tests that generate electrical effects that are measured by monitoring system 116 and digitized for transmission to system 120 for analysis. In one embodiment, electrical response program 300 executes to determine a baseline set of electrical responses for elements connected to PDU 110. In one example, electrical response program 300 executes in response system 120 detecting a new or previously unanalyzed instance of PDU 110 is included within environment 100. In another example, electrical response program 300 executes in response system 120 detecting a modification to PDU 110.

In some embodiments, multiple instance of electrical response program 300 can execute concurrently to analyze different elements of an IT system or IT enclosure. In various embodiments, an instance of electrical response program 300 executes in response to monitoring program 500 requesting to determine electrical responses for an element of an IT system. In other embodiments, electrical response program 300 can determine and analyze electrical responses of an element connected to a portable version of PDU 110 (not shown).

Monitoring program 500 is a program that performs automated, in-situ preventative maintenance activities by periodically determining and comparing electrical response data (e.g., resistance and inductance values) to detect potential or actual electrical issues that are associated with AC electrical connectors, AC power cables, and/or AC loads within environment 100. In various embodiments, monitoring program 500 utilizes aspects of electrical response program 300 to perform various electrical measurements and generate analyses subsequently utilized by monitoring program 500. In an embodiment, monitoring program 500 utilizes one or more comparisons to determine whether an issue (e.g., a potential or an actual electrical problem) is indicated related to a selected element of environment 100 based information included within database 121, and/or one or more models developed utilizing machine learning. In addition, if a compassion indicates an issue, then monitoring program 500 determines and initiates one or more actions to verify and/or correct (e.g., repair) the determined issue.

In some embodiments, monitoring program 500 may initiate electrical response program 300 based on a preventative maintenance (e.g., monitoring) schedule included within database 121, in response to an issue flagged within the same or a different instance of PDU 110, a request from a different instance of environment 100, and/or in response to a machine learning program requesting to obtain additional information to retrain or update one or more models associated with trends, interactions, root-cause analyses, repair durations, etc., related to AC electrical connectors, AC electrical connections, AC power cables, and/or AC loads.

FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

System 102 and one or more instances of AC load 130 may be: laptop computers, tablet computers, netbook computers, personal computers (PC), desktop computers, personal digital assistants (PDA), smartphones, wearable devices (e.g., digital eyeglasses, smart glasses, smart watches, personal fitness devices), or any programmable computer systems known in the art. In various embodiments, PDU 110 includes a micro-controller, system-on-a-chip, an industrial PC (i.e., a service element), or other computer hardware (not shown) for controlling various aspects of PDU 110. In certain embodiments, system 102 represents computer systems utilizing clustered computers and components (e.g., database server computers, application server computers, storage systems, etc.) that act as a single pool of seamless resources when accessed through network 140, as is common in data centers and with cloud-computing applications. In general, system 102 and at least one aspect of PDU 110 are representative of any programmable electronic device or combination of programmable electronic devices capable of executing machine readable program instructions and communicating via network 140.

Figure 6:
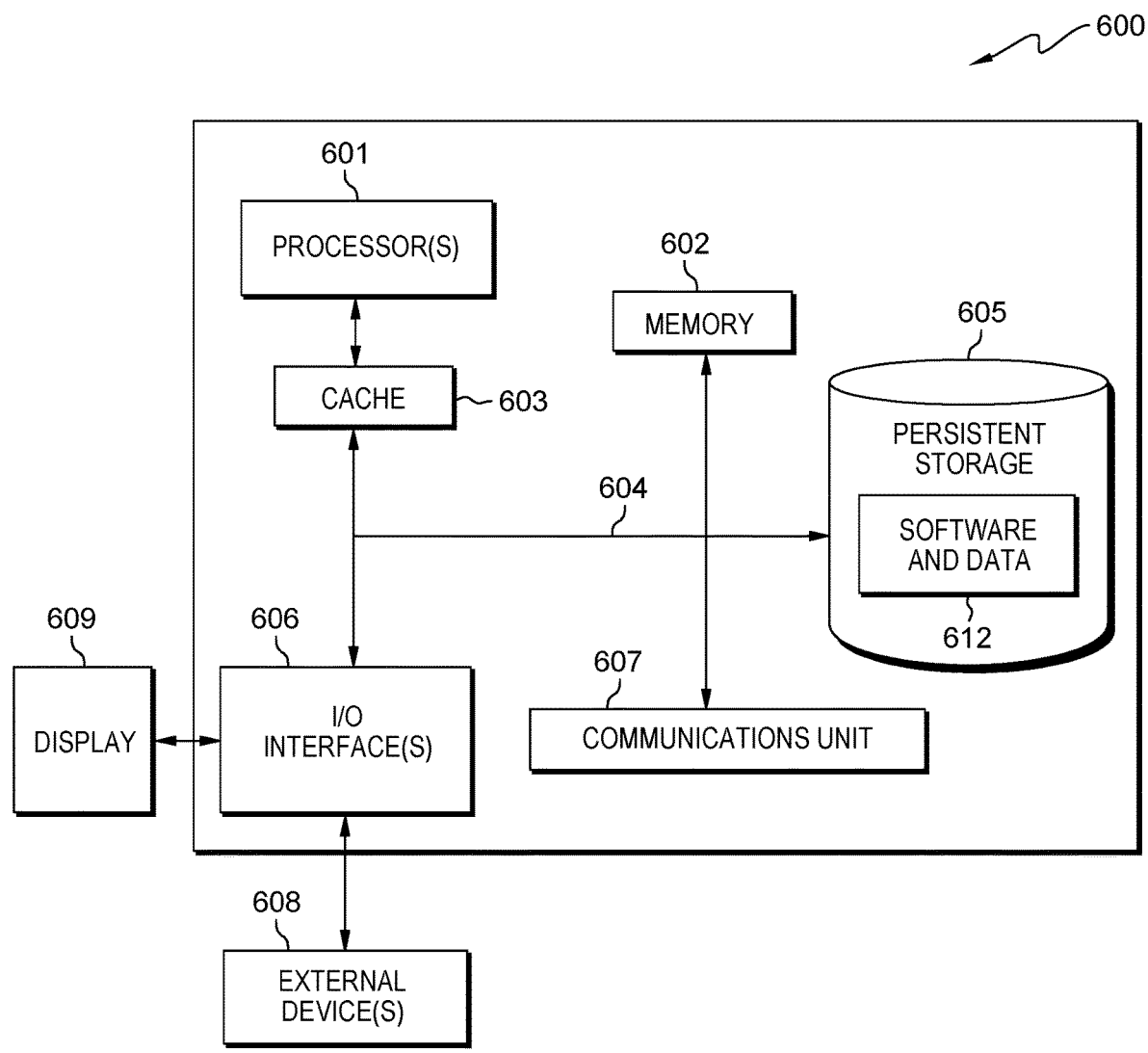
FIG. 6 is a block diagram of components of a computer, in accordance with an embodiment of the present disclosure.

System 102 and PDU 110 include components, as depicted and described in further detail with respect to FIG. 6, in accordance with embodiments of the present disclosure. In some embodiments, various aspects of PDU 110 depicted within FIG. 2, such as monitoring system 116, internal network 201, data acquisition 240 and/or phase angle control 250, etc. may also include components, as depicted and described in further detail with respect to FIG. 6.

In one embodiment, system 120 communicates through network 140 to the PDU 110. Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 120 and PDU 110, in accordance with embodiments of the present disclosure. In various embodiments, network 140 operates locally via wired, wireless, or optical connections and can be any combination of connections and protocols (e.g., personal area network (PAN), near field communication (NFC), laser, infrared, ultrasonic, etc.).

FIG. 2 is an illustrative example of aspects of PDU 110 and a circuit diagram depicting some components included within module 115 utilized to automate impedance measurements related to an AC load, AC power cable, and corresponding AC power connectors, in accordance with embodiments of the present disclosure. FIG. 2 includes sub-environment 200 and other features previously discussed with respect to FIG. 1, such as system 120, AC load 130, AC power cable 131, network 140, and AC source 101 (not currently shown).

In one embodiment, sub-environment 200 illustrates aspects of PDU 110 that include power distribution control 111, IPD 112, an AC power connector (i.e., power connector 114), an illustrative example embodiment of module 115, monitoring system 116, data acquisition 240, phase angle control 250, a portion of CDB 117, and internal network 201. In various embodiments, power connector 114 is representative of power connectors 114 included within PDU 110 of environment 100 that is electrically connected to respective module of modules 115.

In an embodiment, module 115 is representative of module 115-1 through module 115-N included within PDU 110 of environment 100. In one embodiment, module 115 (e.g., a control module) includes intelligent current transformer (ICT) 205; test points (TPS) 207; control relays CR 210 and CR 220; SSCFCD 215; and control signals CS 211, CS 216, and CS 221 respectively associated with components CR 210, SSCFCD 215, and CR 220. In various scenarios, CR 210, CR 220, SSCFCD 215, and ICT 205 are electrically configured along a "hot" AC conductor associated with IPD 112. In another embodiment, power distribution control 111 includes one or more instances of ICT 205 as opposed to module 115 including an instance of ICT 205. In various embodiments, components of module 115 are electrically connected to monitoring system 116 via CDB 117. In some embodiments, one or more components of module 115 can also interface with system 120 via internal network 201.

In an embodiment, internal network 201 includes capabilities and features previously discussed with respect to network 140. In some embodiments, internal network 201 includes aspects of CDB 117, such as Ethernet communications between features and components of PDU 110. In various embodiments, CDB 117 and/or internal network 201 utilize simple network management protocol (SNMP) to trap and obtain pertinent AC voltage and AC current measurements in response to an alert, such as activity by electrical response program 300.

In one embodiment, ICT 205 is an electronic device (i.e., an intelligent current transformer) utilized to monitor the AC current flowing through module 115 that is supplied to AC load 130 via power connector 114 and AC power cable 131. In some embodiments, ICT 205 is electrically connected or operatively coupled to monitoring system 116 via CDB 117. In various embodiments, ICT 205 transmits real-time AC current information (e.g., AC current waveforms and associated harmonics) to one or more aspects of monitoring system 116, such as digital oscilloscope included within data acquisition 240.

In various embodiments, TPS 207 is electrically connected to monitoring system 116 via CDB 117. In an embodiment, TPS 207 is a set of test points for monitoring real-time AC voltages and waveforms associated with power connector 114 and transmitted to one or more aspects of monitoring system 116, such as a digital oscilloscope included within data acquisition 240. An instance of TPS 207 is configured within a close proximity to a respective instance of ICT 205. In some embodiments, another instance of TPS 207 can be configured upstream of CR 210 and CR 220. One respective test point of TPS 207 is connected to the same conductor that is in series with a respective instance of ICT 205 utilized to measure current information.

In an embodiment CS 211, CS 216, and CS 221 (dotted callouts) are representative of control signals that operated respective components CR 210, SSCFCD 215, and CR 220. CS 211 and CS 221 respectively control whether CR 210 and CR 220 are in an open state (e.g., current flow is stopped, disabled, terminated, etc.) or a closed state (i.e., current flows). CS 216 is generated by phase angle control 250, which controls the AC current flow through SSCFCD 215.

In various embodiment, CR 210 is in a closed state during normal operations of PDU 110 to provide uninterrupted power to AC load 130. In some embodiments, if power distribution control 111 and/or IPD 112 cannot isolate an AC power connection (e.g., power connector 114), then PDU 110 can command CR 210 and CR 220 to remain in an open state to isolate power connector 114.

In an embodiment, CR 220 is solid-state relay that is closed and opened utilizing CS 221 to generate harmonic AC current distortions in conjunction with control signals applied to the gate of SSCFCD 215. In other embodiments, CR 220 can remain in a closed state to provide continuous AC power to AC load 130 in response to SSCFCD 215 operating in a constant-conducting mode to provide continuous AC power flow to AC load 130.

SSCFCD 215 is a solid-state current-flow control device that controls the flow (i.e., ON/OFF) of AC current to AC load 130 based on a trigger voltage value or a signal supplied via CS 216 to the gate connection (i.e., angle line) of SSCFCD 215. In the illustrated embodiment, SSCFCD 215 is a TRIAC. In some embodiments, SSCFCD 215 is an SCR. In various embodiments, SSCFCD 215 can turn ON for a portion of an AC waveform based on signal associated with CS 216 related to a phase angle trigger value set by electrical response program 300. In addition, a CS 216 signal may enable SSCFCD 215 to continuously conduct AC current.

In one embodiment, data acquisition 240 includes a plurality of components and electronic devices, such as one or more digital oscilloscopes, data loggers, digital signal processors (DSP), digital voltmeters, etc. that convert various signals received from TPS 207, ICT 205, and other test points and sensors (not shown) via CDB 117, into measured values or digitized waveforms. In some embodiments, data acquisition 240 also converts the measured values and signal into digital information and data that is transmitted to system 120. In various embodiments, an aspect of data acquisition 240 determines the base frequency (e.g., harmonic number 1) corresponding to the AC voltage supplied to power connector 114. In addition, data acquisition 240 can determine the AC voltage and AC current values across a plurality of harmonics of the base AC voltage frequency, which are subsequently utilized to determine corresponding inductive impedance values.

Phase angle control 250 generates CS 216 based on a phase angle control value set by electrical response program 300. Phase angle control 250 utilizes CDB 117 to transmit voltages and control signals to module 115. In an embodiment, phase angle control 250 is synchronized to an AC voltage waveform corresponding to the AC power to be applied to power connector 114, such as the AC power supplied to module 115 via a portion of IPD 112. Because phase angle control 250 is synchronized to the AC voltage waveform, phase angle control 250 can stop transmitting a voltage (e.g., a signal) to the gate connection of SSCFCD 215 (angled line associated with dotted callout CS 216) in response to the AC voltage waveform crossing the zero-volt AC threshold (i.e., 0 degrees of the positive half-cycle of the AC waveform), thereby terminating the flow of AC current through SSCFCD 215. In some embodiments, phase angle control 250 alters the current flow through SSCFCD 215 within less than +/−0.5 degree of a zero-volt AC waveform crossing value and/or a phase angle trigger value.

In one embodiment, while the AC voltage waveform is cycling from 0 degrees to 360 degrees, phase angle control 250 detects when the AC voltage phase angle equals the phase angle trigger value set by electrical response program 300. In response, phase angle control 250 transmits a signal (e.g., CS 216) to the gate of SSCFCD 215 enabling AC current to flow to AC load 130. In some embodiments, phase angle control 250 repeats the process for the negative half-cycle, 180 degrees to 360 degrees of the AC waveform. Phase angle control 250 turns off the AC current flow through SSCFCD 215 at 180 degrees and restores the AC current flow through SSCFCD 215 from (180 plus the phase angle trigger value) degrees through 360 degrees.

In one example, electrical response program 300 utilizes module 115 to determine the resistance of a selected element. Electrical response program 300 directs PDU 110 and/or monitoring system 116 to generate controls signals that open and close CR 210 within one AC voltage waveform while CR 220 remains in an open state to determine a resistance value based on Ohm's Law, $R=(V_{onn}-V_{off})/(I_{onn}-I_{off})$, related to the element combination of power connector 114, AC Load 130, and AC power cable 131. $V_{onn}$ and $V_{off}$ are determined based on the AC voltage signal obtained across TPS 207 and measured by an aspect of data acquisition 240. Data acquisition 240 determines $I_{onn}$ with respect to an AC current waveform received from ICT 205 and $I_{off}=0$. Data acquisition 240 determines "onn" values in response to CS 211 triggering CR 210 to a closed state; and "off" values are determined in response to CS 211 triggering CR 210 to an open state.

In another example, electrical response program 300 utilizes module 115 to determine a set of electrical responses (e.g., inductance values) of a selected element. In response to selecting a phase angle trigger value to analyze, electrical response program 300 instructs monitoring system 116 to set the phase angle trigger for the module of modules 115 corresponding to the power connector of power connectors 114 of the element to analyze. In one embodiment, monitoring system 116 coordinates the opening of CR 210 (e.g., disabling AC current flow), the closing of CR 220, and the triggering of SSCFCD 215 to occur essentially in parallel (e.g., <0.005 milliseconds) utilizing respective control signals and triggers via CS 211, CS 221, and CS 216 in response to the AC voltage waveform crossing the zero-volt AC threshold beginning at the positive half-cycle of an AC waveform. CS 216 may also be utilized during the negative half-cycle of an AC waveform.

In another embodiment, monitoring system 116 generates respective control signals that dictate for CR 220 to close and SSCFCD 215 to operate in continuous conduction mode until data acquisition 240 and phase angle control 250 are ready to perform an electrical analysis. In response to SSCFCD 215 to operating in continuous conduction mode, monitoring system 116 utilizes CS 211 to command CR 210 to an open state. Subsequently, phase angle control 250 dictates when SSCFCD 215 stops the AC current flow and when SSCFCD 215 restores the AC current flow. In an example, if electrical response program 300 determines to obtain electrical results for multiple phase angle trigger values, then the above process may be repeated.

In various embodiment, monitoring system 116 utilizes SSCFCD 215 to generate harmonic voltage and harmonic current distortions by interrupting the flow of AC current to AC load 130. Monitoring system 116 utilizes phase angle control 250 to generate respective instances of CS 216 that interrupt (e.g., stop) the AC current flow starting at 0 degrees and/or 180 degrees of an AC power waveform cycle and restoring the AC current flow based on the phase angle trigger value (discussed above with respect to phase angle control 250). Monitoring system 116 utilizes various aspects of data acquisition 240 to measure and digitize the harmonic voltage and harmonic current distortions corresponding to the selected element. Subsequently, monitoring system 116 utilizes internal network 201 to route the digitized data and information from PDU 110 to system 120 for further calculations (e.g., resistance and inductance values) and analyses. In a further embodiment, if PDU 110 includes computing capabilities, such as a service element, then at least electrical response program 300 can execute within PDU 110 and one or more results are transmitted to database 121 and/or monitor program 500.

Figure 3:
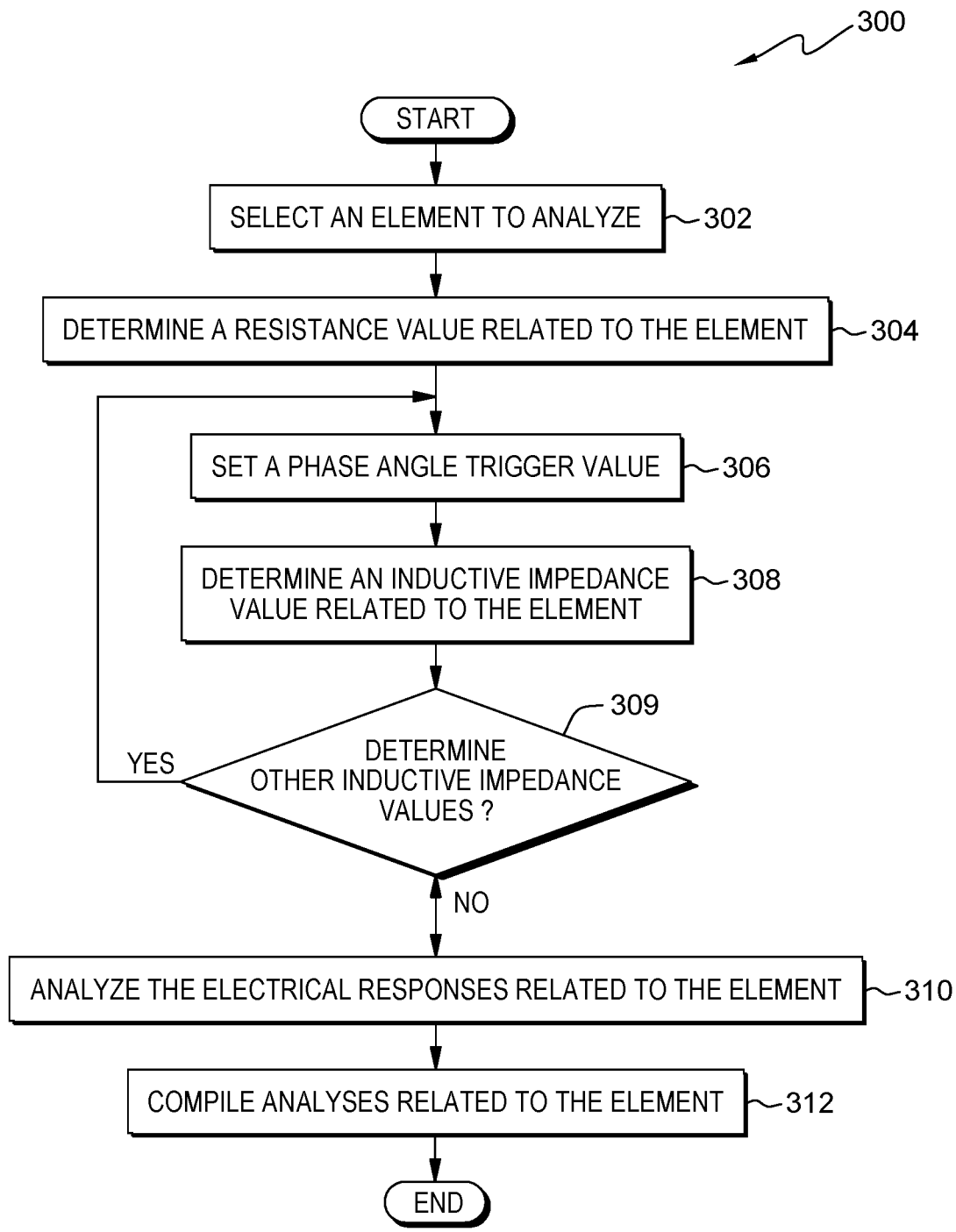
FIG. 3 depicts a flowchart of steps of an electrical response program, in accordance with an embodiment of the present disclosure.

FIG. 3 is a flowchart depicting operational steps for electrical response program 300, a program that determines a set of electrical responses related to one or more components electrically connected to an intelligent AC power distribution unit (PDU) by interfacing with various aspects of the PDU, in accordance with embodiments of the present disclosure.

In step 302, electrical response program 300 selects an element to analyze. In one embodiment, electrical response program 300 selects an element associated with PDU 110 to analyze based on an SMF (not shown) of system 120 identifying one or more new instance of AC 130 that are connected to PDU 110. In another embodiment, in response to upgrading or repairing PDU 110 to include or replace one or more modules of modules 115, electrical response program 300 analyzes each element that is connected to a new or a replaced instance of module 115. Similarly, if an instance of PDU 110 that did not include modules 115 is replaced with another instance of PDU 110 that includes one or more instances of module 115, then electrical response program 300 analyzes each element that is connected to the one or more instances of module 115 of the new PDU 110.

In some embodiments, in response to system 120 determining that a new IT system is added to environment 100, electrical response program 300 analyzes each element connected to the instance of PDU 110 within the new IT system. In other embodiments, electrical response program 300 selects an element to analyze based on dictates received from monitoring program 500 requesting to determine electrical responses related to an element electrically connected to PDU 110, such as a list of one or more instances of AC load 130 identified within preventative maintenance schedule (not shown) stored within system 120 or included within database 121.

In step 304, electrical response program 300 determines a resistance related to the element. Electrical response program 300 determines a resistance related to the element based on utilizing Ohm's law (previously discussed with respect to FIG. 2).

In an embodiment, with respect to various IT components and systems, electrical response program 300 determines the respective values for $V_{onn}$, $V_{off}$, $I_{onn}$, and $I_{off}$ within one AC waveform cycle (e.g., 0 degrees through 360 degrees). In one example, with respect to a 50 Hz AC signal, electrical response program 300 determines the respective values for $V_{onn}$, $V_{off}$, $I_{onn}$, and $I_{off}$ by directing monitoring system 116 to open CR 210 (previously discussed with respect to FIG. 2) within 20+/−0.01 milliseconds and then close CR 210. Subsequently, electrical response program 300 receives the digitized values for $V_{onn}$, $V_{off}$, $I_{onn}$, and $I_{off}$ from monitoring system 116 and calculates the resistance of the selected element.

In step 306, electrical response program 300 sets a phase angle trigger value. In some embodiments, electrical response program 300 sets a phase angle trigger value (previously discussed with respect to FIG. 2) based on a dictate value, such as 30 degrees. In other embodiments, electrical response program 300 sets another phase angle trigger value in response to electrical response program 300 determining to determining other inductive impedance values (Yes branch, decision step 309). In one scenario, electrical response program 300 sets the phase angle trigger value to obtain electrical response analyses based on a dictated set of phase angle trigger values, such as 30.0, 37.5, and 45.0 degrees. In another scenario, electrical response program 300 increments the phase angle trigger value by a dictated increment (e.g., 2 degrees) to identify a different phase angle trigger value that generates an analysis with a resonance response less than a threshold value. For example, electrical response program 300 increments the phase angle trigger value by 2 degrees if standard deviation of the impedance value for eight consecutive harmonic numbers is greater than 1 millihenry by the $25^{th}$ harmonic.

In an embodiment, electrical response program 300 utilizes (e.g., sets) a phase angle trigger value of =>30 degrees and <=45 degrees for the positive half-cycle of an AC waveform, and a phase angle trigger value=>210 degrees and <=225 degrees for the negative half-cycle of an AC waveform. For example, with respect to various IT components and systems electrical response program 300 constrains the phase angle trigger value to <=45 degrees for the positive half-cycle of an AC waveform, and <=225 degrees for the negative half-cycle of an AC waveform to avoid generating instabilities within the power supplies of computer systems and/or components. In another embodiment, electrical response program 300 increases the limits for phase angle trigger value to a value >75 degrees for the positive half-cycle of an AC waveform, and >255 degrees for the negative half-cycle of an AC waveform for other AC powered devices that are less susceptible to a shorter current flow duration.

In step 308, electrical response program 300 determines inductive impedance values related to the element. In an embodiment, electrical response program 300 determines a set of inductive impedance values related to the selected element utilizing various aspects of module 115 and monitoring system 116 (previously discussed with respect to FIG. 2), and the calculations performed by an electrical analysis program or formulas included within another program, such as a spreadsheet program on the data received from PDU 110.

Figure 4:
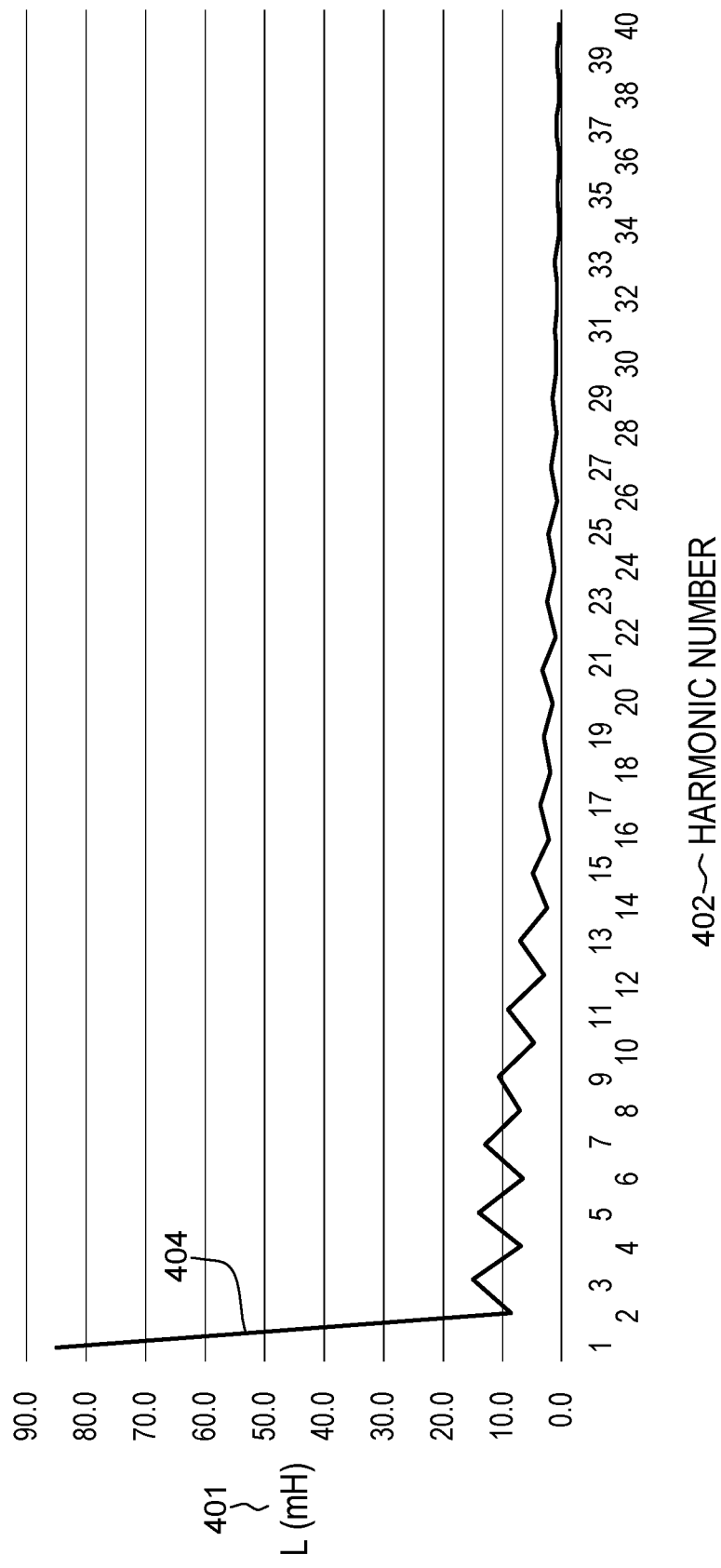
FIG. 4 graphically illustrates a plot of inductive impedance values, at a given phase angle trigger value and across a plurality of frequency harmonics, for an AC load electrically connected to a power distribution unit, in accordance with an embodiment of the present disclosure.

In some embodiment, electrical response program 300 determines a set inductive impedance values related to the element across a plurality of harmonics of the AC power supplied to an instance of AC load 130 (depicted in further detail with respect to FIG. 4). In one scenario, electrical response program 300 determines the set of inductive impedance values related to the element across a plurality of harmonics within a single AC waveform cycle. In another scenario, electrical response program 300 utilizes multiple, non-concurrent single AC waveform cycles to determine the set inductive impedance values related to the element across a plurality of harmonics. In other scenarios, electrical response program 300 retest an element to determine multiple sets inductive impedance values across a plurality of harmonics at the same phase angle trigger value to reduce variabilities, such as eliminating outliers, filtering out random noise, generating statistically significant results, etc., associated with analyses. Electrical response program 300 may utilize a preset delay between determining sets of inductive impedance values or performing retests, such a delay of 10 seconds.

In another embodiment, electrical response program 300 determines a set inductive impedance values related to the element based a different phase angle trigger value in response to one or more electrical response analyses (previously determined in step 310). In some embodiments, electrical response program 300 determines one or more sets of inductive impedance values related to a selected element based on dictated received from monitoring program 500.

In decision step 309, electrical response program 300 determines whether to determine other inductive impedance values. In one embodiment, electrical response program 300 determines whether to determine other inductive impedance values based on one or more rules included within database 121, such as analyzing inductive impedance values related to an element based on a predetermined set of phase angle trigger values. In various embodiments, electrical response program 300 determines to determine other inductive impedance values based a response associated with one or more analyses preformed in Step 310, such as determining that a phase angle trigger value generated resonance effects that produced an unacceptable analysis (e.g., one or more analysis criteria were not achieved).

In some embodiments, electrical response program 300 determines to determine other inductive impedance values based on dictates associated with monitoring program 500, such as obtaining a set of electrical response analyses for two or more phase angle trigger values. In other embodiments, electrical response program 300 determines not to determine other inductive impedance values based on determining that the dictates associated with monitoring program 500 are complete (e.g., fulfilled).

Still referring to decision step 309, in one embodiment responsive to determining to determine other inductive impedance values (Yes branch, decision step 309), electrical response program 300 loops to Step 306 to set another phase angle trigger value to determine the other inductive values related to the element. In another embodiment, responsive to determining to determine another inductive impedance value (Yes branch, decision step 309) based on an unacceptable analysis for a phase angle trigger value, electrical response program 300 loops to step 308 to redetermine the inductive impedance values related to the element at the same phase angle trigger value.

Referring to decision step 309, responsive to determining not to determine other inductive impedance values (No branch, decision step 309), electrical response program 300 analyzes the electrical responses related to the element (step 310).

In step 310, electrical response program 300 analyzes the electrical responses related to the element. In an embodiment, electrical response program 300 utilizes formulas, programs, etc. within database 121 to analyze the electrical responses related to the element, such as identifying resonances, trends related inductive impedance values, statistical information associated with inductance values for one or more groups of harmonic frequency values, etc. Electrical response program 300 may also utilize various statistical techniques know in the art in association with the other formula and/or programs. In one example, electrical response program 300 generates an analysis for one phase angle trigger value that produces the graph depicted in FIG. 4 and the associated statistical information, such as a mean inductance value for harmonic numbers 29 through 40 and the inductance value corresponding to the $39^{th}$ harmonic number. In another example, electrical response program 300 generates analyses for a set of phase angle trigger values for the selected element.

In some embodiments, if electrical response program 300 determines that one or more analyses of the electrical responses related to the selected element produce an unacceptable analysis (e.g., does not meet one or more criteria, thresholds, control limits, etc.), then electrical response program 300 returns to decision step 309 and utilizes the "Yes" branch to determine other inductive impedance values. For example, electrical response program 300 determines that for a phase angle trigger value of 35 degrees that the running standard deviation for impedance values for eight consecutive harmonic numbers remains greater than 1 millihenry by the $25^{th}$ harmonic (e.g., an unacceptable level of resonance), then electrical response program 300 determines to determine other inductive impedance values at a different phase angle trigger value.

Still referring to step 310, in other embodiments electrical response program 300 analyzes the electrical responses related to the element in response to monitoring program 500 requesting to determine electrical responses related to an element. Based on the dictates associated with the request by monitoring program 500 analyzes the electrical responses related to the selected element, electrical response program 300 may accept unacceptable analyses. In response, electrical response program 300 notifies monitoring program 500 the analyses are available for further analysis and/or comparisons to data and analyses within database 121.

In step 312, electrical response program 300 compiles analyses related to the element. Electrical response program 300 may also store raw data and results of calculation within database 121. In one embodiment, electrical response program 300 compiles analyses related to the selected element by storing the analyses within database 121 as baseline analyses related to a new element connected to PDU 110 (e.g., a new instance of AC load 130 and power cable 131). In some embodiments, electrical response program 300 compiles analyses within database 121 related to repairs, upgrades, and/or replacement of parts associated with PDU 110 or the IT system that includes PDU 110. In other embodiments, electrical response program 300 compiles, within database 121, analyses related to one or more requests for electrical response analyses by monitoring program 500.

In various embodiments, electrical response program 300 and/or system 120 performs machine learning on the information within database 121 to determine interactions between phase angle trigger values; types of IT systems; instances of AC 130 (e.g., subsystems, components, elements, etc.); instances of AC power cable 131; information related to repairs, upgrades, and/or replacement of parts associated with PDU 110; and instances of PDU 110 within environment 100. Machine learning may also generate and/or update criteria and threshold related to various analyses stored within database 121. In a further embodiment, information electrical response program 300 and/or system 120 shares the results of the machine learning algorithms among other instances of system 120 and corresponding instances of environment 100 to improve diagnostic and/or preventative maintenance procedures related to systems and/or environments that include instances of PDU 110 that distribute power to a plurality of instance of AC load 130.

FIG. 4 is a graphical depiction of the determined inductive impedance values of an AC load electrically coupled to a respective instance of module 115 operating a given phase angle trigger value within PDU 110, in accordance with embodiments of the present disclosure. In one example, FIG. 4 is generated by a spreadsheet program that imports AC voltage and current values determined by data acquisition 240. In another example, FIG. 4 is generated utilizing an electrical analysis program (not shown) executing on system 120 that utilizes AC voltage and AC current values determined by data acquisition 240.

In one embodiment, FIG. 4 depicts a plot of the determined inductive impedance values in millihenries (axis 401) against harmonic number (axis 402) for a plurality of data values (e.g., AC measurements). In an example, harmonic number 1 corresponds to the inherent AC voltage signal frequency measured within the respective instance of module 115. Harmonic numbers 2 through 40 are integer values applied to the inherent AC signal frequency corresponding to harmonic number 1, which are subsequently utilized to calculate higher-order inductance values, such as harmonic numbers 2 through 40 inclusively. Further, the reactive impedance (i.e., inductance) values corresponding to an element consisting of power connector 114-N, AC power cable 131, and AC load 130 are determined at an AC signal frequency as measured by components of module 115-N (previously discussed with respect to FIG. 2) and based on 30 degree phase angle trigger value (item 403).

Inductive impedance value plot 404 is representative of the inductance values determined utilizing the inherent AC signal frequency and related AC frequency harmonics; and the corresponding AC voltage and the AC current values related to the harmonic distortions generated utilizing module 115 to disrupt the AC current flow based on an AC voltage signal and the phase angle trigger value of 30 degrees. For example, inductive impedance value plot 404 is generated in association with module 115 (previously discussed with respect to FIG. 2) turning off AC current flow at 0 degrees of the AC voltage signal, restoring the AC current flow from 30 degrees until 180 degrees, turning off the AC current flow from 180 degrees to 210 degrees, and restoring AC current flow after 210 degrees until at least the next zero-volt AC crossing.

Figure 5:
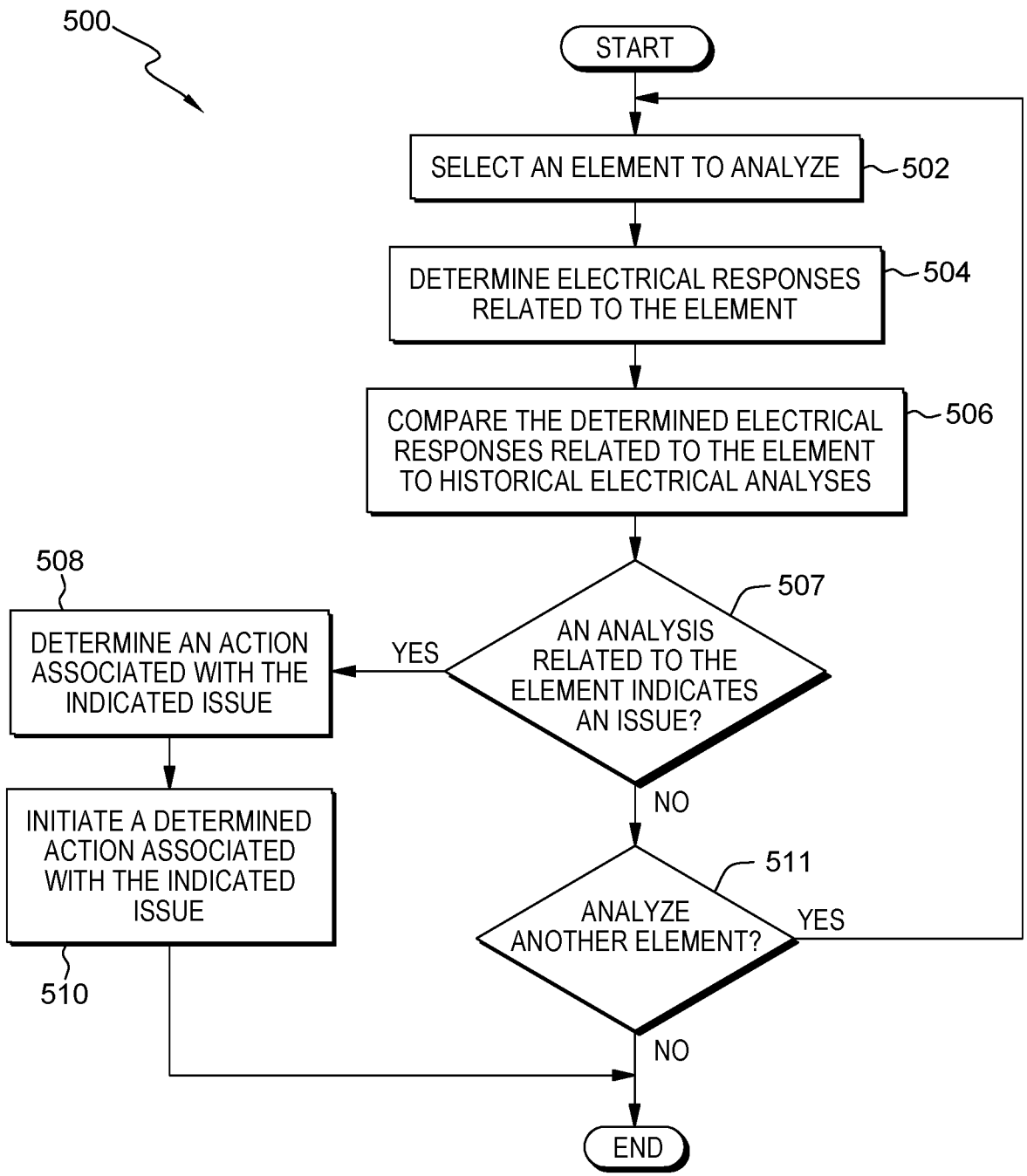
FIG. 5 depicts a flowchart of steps of a monitoring program, in accordance with an embodiment of the present disclosure.

FIG. 5 is a flowchart depicting operational steps for monitoring program 500, a program that automatically redetermines and reanalyzes various electrical responses of an element of a PDU and/or an AC load connected to the PDU, in accordance with embodiments of the present disclosure. In one embodiment, embodiment monitoring program 500 executes concurrently with one or more instances of electrical response program 300. In various embodiments, monitoring program 500 responds to a determination that a monitored element or a PDU within environment 100 deviates from one or more historical measurements and/or criteria, and initiates a determined action. In some embodiments, monitoring program 500 constrains when periodic analyses occur to reduce interference by factors outside of an element being tested. For example, monitoring program 500 restricts the periodic analyses base on time-of-day or based on an amount of work executing on AC loads of a PDU.

In step 502, monitoring program 500 selects an element to analyze. Monitoring program 500 may utilize monitoring system 116 and/or power distribution control 111 of PDU 110 to automatically select an element to analyze. In one embodiment, monitoring program 500 selects an element related to PDU 110 to analyze based on preventative maintenance schedule (e.g., element list and dates) stored within system 120 or included within database 121. In another embodiment, monitoring program 500 selects an element related to PDU 110 to analyze in response to reactivating an instance of AC load 130 but prior to enabling user activities (e.g., dynamic power management). In some embodiments, 500 selects an element to analyze based on a request from system 120, a different instance of environment 100, or another program (not shown).

In other embodiments, monitoring program 500 directs an operator or a service technician (not shown) associated with environment 100 to manually connect a selected element for analysis. In one scenario, monitoring program 500 may direct a service technician associated with environment 100 to manually connect an element for analysis to an unused (e.g., a dictated) power connector of PDU 110, such as power connector 114-1 or manually connect AC load 130 to power connector 114-N utilizing a different instance of AC power cable 131. In another scenario, monitoring program 500 directs a service technician associated with environment 100 to manually connect an element for analysis to an AC power connector (not shown) included within a portable version of PDU 110 (e.g., a mobile tester).

In step 504, monitoring program 500 determines electrical responses related to the element. In an embodiment, 500 determines electrical responses related to the element monitoring program 500 by transmitting a request to electrical response program 300 to determine electrical responses and associated analyses related the selected element connected to PDU 110. Monitoring program 500 may also include one or more dictates identified within database 121 that are associated with the request for electrical response program 300 to determine electrical responses related to the selected element. For example, monitoring program 500 may dictate the set of phase angle trigger values to test; phase angle trigger value increments; analysis parameters, such as statistical limits or thresholds; etc.

In various embodiments, in response to monitoring program 500 transmitting a request to electrical response program 300, monitoring program 500 receives electrical response information (e.g., one or more measured and/or calculated electrical values) from electrical response program 300 related to the selected element. Alternatively, monitoring program 500 receives a notification (e.g., a message) from electrical response program 300 that the electrical response information and analyses are available within database 121.

In step 506, monitoring program 500 compares the determined electrical responses related to the element to historical electrical analyses. In one embodiment, monitoring program 500 compares the electrical response information and analyses determined by electrical response program 300 for the selected element to historical information associated with selected element within database 121. In some scenarios, monitoring program 500 compares the electrical response information and analyses to historical information within database 121 to identify a trend associated with the selected element, such as an increasing mean impedance and/or resistance values. In other scenarios, monitoring program 500 compares the electrical response information and analyses to historical information within database 121 related to elements that were identified as having maintenance issues, such as a loose connector; corroded connections; or damaged power cables (e.g., cold-solder joints, nicked insulation, a narrowed conductor, etc.).

In another embodiment, monitoring program 500 compares the determined electrical responses related to the element to historical electrical analyses of differing elements. For example, if an element has not been automatically tested sufficiently to obtain statistically significant information to determine threshold values, then monitoring program 500 queries database 121 to find similar elements and/or AC loads connected to PDU 110 or elements and/or AC loads connected to other instance of PDU 110, such as within another instance of environment 100 that include thresholds based on statistically significant information.

Still referring to step 506, in various embodiments monitoring program 500 utilizes thresholds and/or criteria included within database 121 to determine whether a comparison of electrical analyses indicates an issue relate to the selected element. In one example, if the mean inductance value for harmonic numbers 29 through 40 of the selected element increases more than 2 millihenries and the resistance increase more than 0.05 ohms, then monitoring program 500 determines that an issue is indicated for the element connected to PDU 110, such as power connector 114-N. In another example, if the mean inductance value for harmonic numbers 29 through 40 of the selected element increases less than 1 millihenry but multiple phase angle trigger values trigger generate resonances, then monitoring program 500 may determine that an issue is indicated for the power cable (e.g., power cable 131) electrically connected to AC load 130.

In other embodiments, monitoring program 500 performs comparisons among a plurality of elements of PDU 110 to determine whether an issue is isolated to a particular element; whether the issue is associated with another component of PDU 110, such as power distribution control 111; or whether the issue is external to PDU 110, such as a main power cable connected to AC source 101 or switching gear associated with AC source 101.

In decision step 507, monitoring program 500 determines whether an analysis related to the element indicates an issue. In an embodiment, monitoring program 500 determines that the analysis related to the element indicates an issue with respect to the selected element based on one or more comparisons performed in step 506.

Responsive to determining that an analysis related to the element does not indicate an issue (No branch, decision step 507), monitoring program 500 determines whether to analyze another element (decision step 511).

In decision step 511, monitoring program 500 determines whether to analyze another element. In one embodiment, monitoring program 500 determines to analyze another element connected to PDU 110 based on determining that a list of elements to analyze includes one or more elements not yet analyzed. In another embodiment, monitoring program 500 determines to analyze another element connected to PDU 110 based on a request from system 120 or another program (not shown), such as a machine learning program requesting to analyze a similar instance of AC load 130 that is exhibiting a change to one or more electrical responses, which are trending toward an action limit (e.g., threshold).

Responsive to determining to analyze another element (Yes branch, decision step 511), monitoring program 500 loops to Step 502 to select another element to analyze.

Responsive to determining to not analyze another element (No branch, decision step 511), monitoring program 500 terminates.

Referring to decision step 507, responsive to determining that an analysis related to the element indicates an issue (Yes branch, decision step 507), monitoring program 500 determines an action associated with the indicated issue (step 508).

In step 508, monitoring program 500 determines an action associated with the indicated issue. Actions associated with the indicated issue may include analyzing one or more other elements of PDU 110 to determine whether the issue is isolated to power connector 114-N, determining a severity related to the indicated issue (e.g., repair by in-house maintenance personnel, notify a service group, etc.), estimating a duration to verify and repair the indicated issue, etc. Monitoring program 500 may also determine impacts to one or more user that utilize the element affected by the indicated issue. Monitoring program 500 may also determine a hierarchy among the determined actions, such as not allowing new processes or user to access the affected element, migrating processes and workload to other IT systems or subsystems, notify an administrator of environment 100, etc.

In one embodiment, monitoring program 500 determines an action associated with the indicated issue associated with the analyzed element by querying database 121 on a local instance of system 120. Actions associated with the indicated issue may include inspecting electrical power connections of a power connector and AC power cable related to an AC load; tighten, clean, repair electrical connections; utilize an unused power connector of power connectors 114, replace AC power cable 131, etc. In another embodiment, if databased 121 does not include one or more actions to perform with regard to the indicated issue, then monitoring program 500 polls other instances of database 121 within different instances of environment 100 or an enterprise-based instance of database 121 (not shown) to determine one or more actions to perform with regard to the indicated issue associated with the analyzed element. In some embodiments, monitoring program 500 obtains one or more actions associated with the indicated issue by communicating with various network-accessible sources, such as databases of a service organization, on-line service/equipment manuals, a virtual engineer, an engineer of a service organization, etc., (not shown).

Still referring to step 508, in other embodiments if monitoring program 500 cannot automatically obtain one or more actions to perform with regard to the indicated issue associated with the analyzed element from one or more network-accessible sources, then monitoring program 500 transmits a request for manual intervention. For example, monitoring program 500 requests help (e.g., inputs, a set of actions to perform) via the SMF of system 120 and/or communication with a service organization (not shown) that supports environment 100.

In step 510, monitoring program 500 initiates a determined action associated with the indicated issue. In one embodiment, monitoring program 500 interfaces with a SMF of system 120 to gracefully shutdown of an instance AC load 130 prior to maintenance activity to confirm an issue and/or repair the issues associated with AC load 130 and/or the corresponding power connector of power connector 114-N and AC power cable 131. In another embodiment, monitoring program 500 initiates a determined action or set of actions associated with the indicated issue by notifying (e.g., opening a service ticket) maintenance personnel associated with environment 100 or a service group responsible for environment 100 to perform the determined maintenance activities related to PDU 110 and/or a tested element the is associated with an indicated issue.

In various embodiments, in response to initiating various actions monitoring program 500 receives feedback (e.g., results, reports, failure mode information, etc.) that is added to database 121 as historical data, which can subsequently reviewed by the administrator of environment 100 and/or a machine learning program. In some embodiments, if multiple elements of PDU 110 or other instances of PDU 110 are exhibiting issues (e.g., impedance spikes or larger than predicted anomalies within electrical response analyses), then monitoring program 500 can direct service/maintenance personnel to inspect electrical components upstream of PDU 110, such as inspecting switching gear and power cables associated with AC source 101.

Still referring to step 510, in a further embodiment, if monitoring program 500 determines that an issue is not identified with an element, but one or more analyses do not conform to criteria or thresholds, then monitoring program 500 initiates one or more machine learning algorithms to identify new interactions and/or update models, thresholds, criteria, etc., included within database 121. Similarly, if monitoring program 500 obtains feedback or results from maintenance activity related to one or more elements that does not conform with information, actions, and/or analyses within database 121, then then monitoring program 500 initiates one or more machine learning algorithms to identify new interactions and/or update models, thresholds, criteria, etc., included within database 121.

FIG. 6 depicts computer system 600, which is representative of system 120 and one or more aspects of PDU 110. Computer system 600 is an example of a system that includes software and data 612. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606.

Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random-access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. In one example, a removable hard drive may be used for persistent storage 605. Other examples include optical and magnetic disks, thumb drives, smart cards that are inserted into a drive for transfer onto another computer readable storage medium that is also part of persistent storage 605.

Software and data 612 are stored in persistent storage 605 for access and/or execution by one or more of the respective processor(s) 601 via cache 603 and one or more memories of memory 602. With respect to system 120 software and data 612 includes database 121, electrical response program 300, monitoring program 500, and other programs and data (not shown). With respect to PDU 110 software and data 612 includes firmware (not shown), and programs and data downloads to PDU 110 by at least system 120.

Communications unit 607, in these examples, provides for communications with other data processing systems or devices, including resources and program executing on the Internet (not shown). In these examples, communications unit 607 includes one or more network interface cards. Communications unit 607 may provide communications, through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more computer processors, a group of elements electrically connected to a power distribution unit (PDU), wherein the PDU supplies AC power to an AC load of the group of elements;
    determining, by one or more computer processors, a resistance corresponding to the group of elements utilizing a solid-state relay;
    dictating, by one or more computer processors, a phase angle trigger value to activate a solid-state current-flow control device;
    determining, by one or more computer processors, a set of inductive impedance values corresponding to the group of elements utilizing the solid-state current-flow control device to control AC current flow to the group of elements based on the dictated phase angle trigger value;
    generating, by one or more computer processors, an analysis of the determined set of inductive impedance values corresponding to the group of elements; and
    identifying, by one or more computer processors, from the analysis of the determined set of inductive impedance values and analysis of historical data, whether the group of elements require maintenance to address an indicated issue.

2. The method of claim 1, wherein the group of elements includes an AC power connection included within the PDU, an AC power cable that includes power connections to electrically connect the AC power cable to the power connection at the PDU, and the AC load electrically connected to the AC power cable.

3. The method of claim 1, wherein the solid-state relay stops and restores the AC current flow within one 360 degree cycle of a sinusoidal AC voltage waveform within +/−1 degree.

4. The method of claim 1, wherein determining the set of inductive impedance values corresponding to the group of elements utilizing the solid-state current-flow control device to control the AC current flow to the group of elements based on the dictated phase angle trigger value further comprises:
    dictating, by one or more computer processors, that the solid-state current-flow control device stops the AC current flow to the group of elements at a zero-volt AC positive crossing of a sinusoidal AC voltage waveform, and the solid-state current-flow control device restores the AC current flow to the group of elements at the dictated phase angle trigger value; and
    dictating, by one or more computer processors, that the solid-state current-flow control device stops the AC current flow to the group of elements at zero-volt AC negative crossing of the sinusoidal AC voltage waveform, and restores the AC current flow to the group of elements at the dictated phase angle trigger value plus 180 degrees corresponding to the sinusoidal AC voltage waveform.

5. The method of claim 4, further comprising:
    determining, by one or more computer processors, a set of AC voltage and AC current values prior to an AC power connection of the PDU electrically connected to the AC load;
    determining, by one or more computer processors, a frequency corresponding to the sinusoidal AC voltage waveform; and
    calculating, by one or more computer processors, an inductive impedance value corresponding to a plurality of harmonic values related to the determined frequency of corresponding to the sinusoidal AC voltage waveform.

6. The method of claim 5, wherein the plurality of harmonic values associated with the sinusoidal AC voltage waveform include harmonic frequency numbers from 1 to 40 inclusively.

7. The method of claim 1, further comprising:
determining, by one or more computer processors, that the generated analysis indicates a resonance effect that exceeds a statistical threshold;
incrementing, by one or more computer processors, the phase angle trigger value by a dictated amount; and
determining, by one or more computer processors, another set of inductive impedance values corresponding to the group of elements based on the incremented phase angle trigger value.

8. The method of claim 1, wherein the phase angle trigger value is a value >=30 degrees and <=45 degrees.

9. The method of claim 1, wherein the solid-state current-flow control device controls the AC current flow to the AC load within +/−0.5 degrees of a dictated phase angle associated with a sinusoidal AC voltage waveform.

10. A computer program product, the computer program product comprising:
one or more non-transitory computer readable storage media and program instructions stored on the one or more non-transitory computer readable storage media, the program instructions readable/executable by one or more computer processors:
program instructions to determine a group of elements electrically connected to a power distribution unit (PDU), wherein the PDU supplies AC power to an AC load of the group of elements;
program instructions to determine a resistance corresponding to the group of elements utilizing a solid-state relay; program instructions to dictate a phase angle trigger value to activate a solid-state current-flow control device;
program instructions to determine a set of inductive impedance values corresponding to the group of elements utilizing the solid-state current-flow control device to control AC current flow to the group of elements based on the dictated phase angle trigger value;
program instructions to generate an analysis of the determined set of inductive impedance values corresponding to the group of elements; and
program instructions to identify, from the analysis of the determined set of inductive impedance values and analysis of historical data, whether the group of elements require maintenance to address an indicated issue.

11. A system, the system comprising:
a power distribution unit (PDU) wherein the PDU includes:
(i) a power distribution bus;
(ii) a plurality of control modules electrically connected to the power distribution bus;
(iii) a plurality of power connectors electrically connected to the corresponding plurality of control modules;
(iv) a monitoring system;
(v) a micro-controller; and
(vi) one or more computer readable storage media; and
program instructions stored on the computer readable storage media for execution by at least the micro-controller, the program instructions comprising:
program instructions to determine a group of elements electrically connected to the PDU, wherein the PDU supplies AC power to an AC load of the group of elements;
program instructions to determine a resistance corresponding to the group of elements utilizing a first feature of a respective control module, of the plurality of control modules, that is electrically connected to the AC load;
program instructions to dictate a phase angle trigger value to activate a second feature of the respective control module;
program instructions to determine a set of inductive impedance values corresponding to the group of elements utilizing the first feature, the second feature, a third feature, and a fourth feature of the control module, based the dictated phase angle trigger value;
program instructions to generate an analysis of the determined set of inductive impedance values corresponding to the group of elements; and
program instructions to identify, from the analysis of the determined set of inductive impedance values and analysis of historical data, whether the group of elements require maintenance to address an indicated issue.

12. The system of claim 11, wherein the group of elements includes an AC power connector included within the PDU, an AC power cable that includes power connections to electrically connect the AC power cable to the power connector at the PDU, and the AC load electrically connected to the AC power cable.

13. The system of claim 11, wherein the plurality of control models, the monitoring system, and the micro-controller are operatively coupled via a data and control bus.

14. The system of claim 11:
wherein the respective control module, of the plurality of control modules, includes the first feature, the second feature, and the third feature that control AC current from the power distribution bus to corresponding power connectors,
wherein the first feature, the second feature, and the third feature are semiconductor devices; and
wherein the fourth feature obtains information related to AC current flow to a corresponding AC power connector.

15. The system of claim 14, wherein the first feature and the third feature are solid-state relays.

16. The system of claim 14, wherein the second feature is a solid-state flow control device that controls AC current flow based on a control signal related to a phase angle associated with a sinusoidal AC voltage waveform corresponding to AC power supplied to the respective control module and further based on the dictated phase angle trigger value.

17. The system of claim 14, wherein the fourth feature is an intelligent current transformer that is operatively coupled to the monitoring system via a data and control bus.

18. The system of claim 11, wherein program instructions to determine a set of inductive impedance values corresponding to the group of elements utilizing the first feature, the second feature, the third feature, and the fourth feature of the control module based on the dictated phase angle trigger value further comprise:
program instruction to generate a set of control signals that stops AC current flow through the first feature of the respective control module, and initiates AC current flow through the third feature of the respective control module;
program instructions to dictate that the second feature of the respective control module stops the AC current flow to the group of elements at a zero-volt AC positive crossing of a sinusoidal AC voltage waveform, and the third feature of the respective control module restores the AC current flow at the dictated phase angle trigger value; and program instructions to dictate that the third feature of the respective control module stops the AC current flow at zero-volt AC negative crossing of the sinusoidal AC voltage waveform, and the third feature of the respective control module restores the AC current flow to the group of elements at the dictated phase angle trigger value plus 180 degrees corresponding to the sinusoidal AC voltage waveform.

19. The system of claim 18, further comprising:

program instruction to determine a set of AC voltage and AC current values prior to an AC power connector of the PDU electrically connected to the AC load, utilizing at least the fourth feature and the monitoring system;

program instruction to determine a frequency corresponding the sinusoidal AC voltage waveform utilizing the monitoring system and a data and control bus; and program instruction to calculate an inductive impedance value corresponding to a plurality of harmonic values related to the determined frequency of the sinusoidal AC voltage waveform.

20. The system of claim 11, wherein the phase angle trigger value is a value >=30 degrees and <=45 degrees.

* * * * *